(12) United States Patent
Faro, Sr.

(10) Patent No.: US 11,110,573 B2
(45) Date of Patent: Sep. 7, 2021

(54) PUSH-FIT DE-COUPLING TOOL

(71) Applicant: Daniel A. Faro, Sr., Glen Burnie, MD (US)

(72) Inventor: Daniel A. Faro, Sr., Glen Burnie, MD (US)

( * ) Notice: Subject to any disclaimer, the term of this patent is extended or adjusted under 35 U.S.C. 154(b) by 678 days.

(21) Appl. No.: 15/813,570

(22) Filed: Nov. 15, 2017

(65) Prior Publication Data
US 2018/0133875 A1 May 17, 2018

Related U.S. Application Data

(60) Provisional application No. 62/423,355, filed on Nov. 17, 2016.

(51) Int. Cl.
*B25B 27/10* (2006.01)
*B25B 7/12* (2006.01)
*F16L 37/091* (2006.01)

(52) U.S. Cl.
CPC .............. *B25B 27/10* (2013.01); *B25B 7/123* (2013.01); *F16L 37/0915* (2016.05)

(58) Field of Classification Search
CPC .......... B25B 27/00; B25B 27/02; B25B 9/00; B25B 9/04; B25B 7/12; B25B 27/10; B25B 7/123; B25D 1/16; F16L 37/0915; Y10T 29/53896; Y10T 29/539; Y10T 29/53987; Y10T 29/53683; Y10T 29/53657
USPC ........................... 29/280, 234, 237, 267, 268
See application file for complete search history.

(56) References Cited

U.S. PATENT DOCUMENTS

| | | | |
|---|---|---|---|
| 1,131,162 A * | 3/1915 | Sackett | B29C 73/12 81/15.2 |
| 3,312,484 A | 4/1967 | Davenport | |
| 3,365,219 A | 1/1968 | Nicolaus | |
| 3,424,450 A * | 1/1969 | Atkins | B23Q 3/06 269/87.1 |
| 3,845,538 A * | 11/1974 | Dernier, Sr. | B25B 27/16 29/234 |
| 3,924,882 A | 12/1975 | Ellis | |
| 4,805,505 A * | 2/1989 | Cantlin | B27B 27/08 269/236 |
| 5,156,508 A * | 10/1992 | Grisley | B25B 5/08 269/236 |
| 5,188,401 A | 2/1993 | Staniforth | |
| 5,409,066 A | 4/1995 | McHugh | |
| 5,537,727 A * | 7/1996 | Mayer | B25B 27/10 29/237 |
| 5,609,212 A | 3/1997 | McHugh | |

(Continued)

*Primary Examiner* — Joseph J Hail
*Assistant Examiner* — Timothy B Brady
(74) *Attorney, Agent, or Firm* — Baker Donelson

(57) ABSTRACT

A novel de-coupling tool for push-fit connectors that employs a novel compression carousel including a parallel pair of clover-shaped discs slidably secured together by a central axle and a plurality of radially-spaced spindles, the discs being spring-biased apart by at least one spring. Each clover shaped disc is shaped with a plurality of radially-spaced open yokes of various sizes for capturing different sizes of push-fit couplings. The compression carousel is rotatable about the central axle to select an appropriately-sized pair of yokes depending on the size of the coupling. Both a vice-grip embodiment and a lever-operated embodiment are disclosed, in both cases that compress the opposing discs together.

17 Claims, 4 Drawing Sheets

(56) References Cited

U.S. PATENT DOCUMENTS

| | | | | |
|---|---|---|---|---|
| 8,356,402 B2 * | 1/2013 | Xie | ............ | B25B 27/10 |
| | | | | 29/237 |
| D709,979 S * | 7/2014 | Prieto | ............ | B29C 73/12 |
| | | | | D22/108 |
| 9,228,681 B2 | 1/2016 | Kluss | | |
| 2008/0314205 A1 * | 12/2008 | Feliciano | ............ | F16L 37/0915 |
| | | | | 81/426 |
| 2012/0266428 A1 * | 10/2012 | Hodges | ............ | B25B 27/0035 |
| | | | | 29/239 |

\* cited by examiner

PUSH-FIT DE-COUPLING TOOL

CROSS-REFERENCE TO RELATED APPLICATION(S)

The present application derives priority from U.S. Provisional Patent Application 62/423,355 filed 17 Nov. 2016.

BACKGROUND OF THE INVENTION

1. Field of the Invention

The present invention relates to hand tools and, more particularly, to a de-coupling tool for push-fit connectors.

2. Description of the Background

Traditional pipe couplings are typically threaded so as to receive a corresponding threaded end of a section of pipe or another pipe fitting. Frequently, pipe joint compound, sealing tape or the like is used on the threads to ensure a leak-proof connection. More recently, non-threaded pipe couplings have gained in popularity. There are push-fit connector arrangements such as shown in U.S. Pat. Nos. 5,409,066 and 5,609,212 to McHugh, U.S. Pat. No. 3,312,484 to Davenport, U.S. Pat. No. 3,365,219 to Nicolaus, U.S. Pat. No. 3,924,882 to Ellis, U.S. Pat. No. 5,188,401 to Staniforth, etc.

One exemplary push-fit coupling for pipe ends that has gained commercial notoriety is the SharkBite™ Push-Fit quick-connect coupling manufactured by Reliance Worldwide Corporation (Australia). The SharkBite™ syaxle is marketed as the easiest and most dependable way to join copper, CPVC or PEX pipe in any combination—with no soldering, clamps, unions or glue. The syaxle is disclosed in U.S. Pat. No. 9,228,681 to Kluss issued Jan. 5, 2016. The SharkBite™ fitting works via a two stage process: 1) the tubing is passed through a release collar and then through a stainless steel grab ring with teeth; 2) the tube is then pushed through an O-ring protector that aligns the tube, and an O-ring that compresses between the pipe and the fitting. The SharkBite™ fitting works well to secure the pipe. In theory, after the fitting is completed the release collar can be displaced to engage and release the teeth of the grab ring from the outside surface of the conduit. However, in practice this has proven quite difficult.

It is known to use a disassembly clip or tongs to assist in disassembling the SharkBite™ fitting from a pipe. Use of the clip requires using one hand to grab the fitting and the other to apply the clip, which requires hand strength and space. United States Patent Application 20080314205 by Feliciano published Dec. 25, 2008 discloses a pair of pliers with U-shaped opposing jaws, one of which holds the pipe and the other the coupling. Squeezing the pliers compresses the internal grab ring, causing the teeth to splay thus freeing the pipe so that it may be removed from the coupler. Unfortunately, this tool must still be inserted sidelong and requires significant dexterity and space, as well as force to break and separate the coupling. In addition, a different size tool is required for each different size of coupling.

What is needed is a release tool that provides more mechanical leverage, accommodates a range of pipe/fitting sizes, and which can be locked into the compressed position, thereby freeing the hands of the operator. Thus the object of this invention is to provide a more effective de-coupling tool for push-fit connectors that affords head-on remote access to the fitting in a tight space, has increased mechanical advantage utilizing leverage to provide separation force, easily compresses the release collar, and locks in a compressed configuration to free the hands of the operator. In addition, the tool is capable of separating a plurality of different sizes of push-fit connectors.

SUMMARY OF THE INVENTION

It is, therefore, an object of the present innovation to provide a novel de-coupling tool for push-fit connectors that affords head-on remote access to the fitting in a tight space.

It is another object of the invention to provide a de-coupling tool with increased mechanical advantage.

It is another object of the invention to provide a de-coupling tool that locks into a compressed configuration to free the hands of the operator.

It is another object to provide a de-coupling tool with a variety of user-selectable setting to accommodate a variety of different sizes of push-fit connectors.

In accordance with the foregoing objects, two embodiments are shown including a vice-grip version and a lever-operated version.

Both embodiments include a compression carousel including a parallel pair of clover-shaped discs slidably secured together by a central axle and a plurality of radially-spaced spring-biased spindles to maintain separation. Each clover shaped disc is shaped with a plurality of radially-spaced open yokes of various sizes for capturing different sizes of push-fit couplings. The compression carousel is rotatable about the central axle to select an appropriately-sized pair of yokes depending on the size of the coupling.

In the vice-grip embodiment, the compression carousel is actuated by a hand-operated vise-grip assembly that compresses the opposing discs together. The vice-grip assembly includes a stationary handle that extends to a fixed annular shroud for seating the compression carousel, and an operating lever for articulating a movable jaw counter-opposed to said shroud.

In the lever-actuated embodiment the carousel is actuated by a hand-operated lever assembly that is attached to the central axle, and which functions as a cam to compress the opposing discs of said compression carousel together.

The present push-fit de-coupling tool affords head-on remote access to the fitting in a tight space, has increased mechanical advantage utilizing leverage to provide separation force, and easily compresses the release collar. In addition, the tool is capable of separating a plurality of different sizes of push-fit connectors. Other objects, features, and advantages of the present invention will become more apparent from the following detailed description of the preferred embodiments and certain modifications thereof.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

The present invention is a de-coupling tool for push-fit connectors that provides head-on remote access to the coupling in tight spaces, provides increased mechanical advantage for separation force, locks in position to free the hands, and more easily compresses the release collar. In addition, the tool is capable of separating a plurality of different sizes of push-fit connectors.

Figure 1:
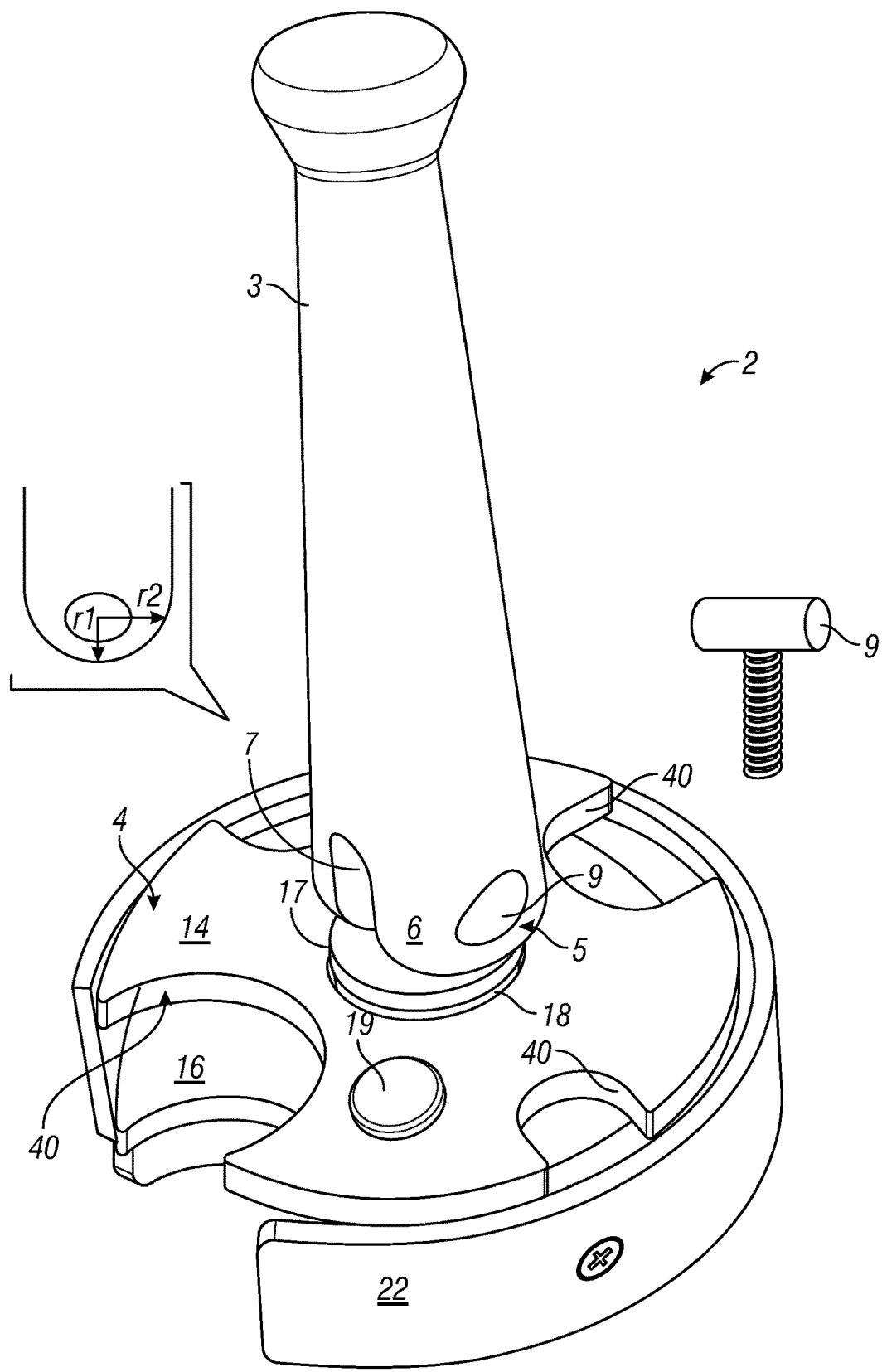
FIG. 1 is a side perspective view of a push-fit decoupling tool according to an embodiment of the invention.
Figure 2:
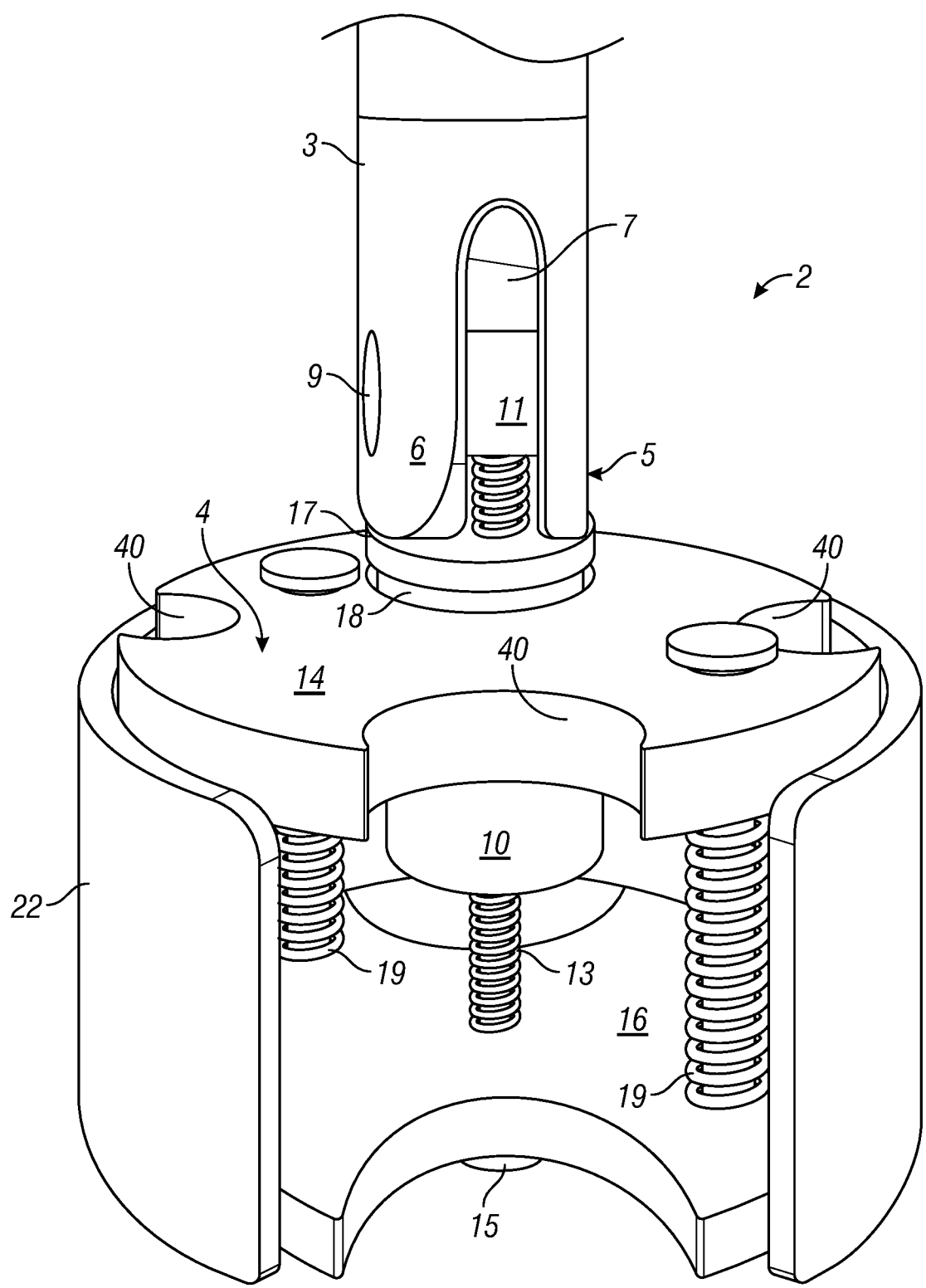
FIG. 2 is a close-up perspective view of the push-fit decoupling tool of FIG. 1.

FIGS. 1-2 are a side perspective view, and close-up view, respectively, of a push-fit decoupling tool 2 according to an embodiment of the invention. Tool 2 generally includes an elongate handle 3 pivotally attached to a compression carousel 4 at a camming mechanism 5. Handle 3 comprises an elongate jointed tool handle extending to a pivot-yoke 6 as typically used for pivot-head ratchet wrenches. The yoke 6 comprises two flanking flanges separated by a notch 7, and a though-bore 9 passing through both flanges. The handle 3 is attached to the compression carousel 4 by a pivot pin 11 inserted through the though-bore 9 passing through both flanges, and held therein by a close compression fit. The pivot pin 11 is defined by a threaded lateral channel for screw-insertion of a threaded stem 13 of compression carousel 4 as will be described. The handle 3 has a generally circular cross-section but the yoke 6 is eccentric, with a forward radius r1 from the center of through-bore 9 to the front edge of yoke 6 being slightly less than the sideward radius r2 from the center of through-bore 9 to the top or bottom edge of yoke 6. This offset creates a camming action when the lever 3 is twisted from the substantially vertical position as shown in FIG. 1 in any direction. The camming action compresses the compression carousel 4 together.

The compression carousel 4 further comprises a pair of clover-shaped discs 14, 16, the two discs being secured together in a parallel-spaced relation by the threaded stem 13. The stem 13 slidably passes through the lower disk (see FIG. 2) by a finger-knob 15 and slidably passes upward through a hole in a hub 10 in the upper disk that allows for the separation of disks 14, 16 to be adjusted by hand. Both discs 14, 16 are defined by U-shaped recesses or "yokes" 40 of graduating size for capturing four different standard sizes of push-fit coupling, preferably four recesses in a four-leaf-clover configuration.

The illustrated embodiment includes a peripheral shroud 22 partially surrounding the compression carousel 4 but leaving an open window larger than one U-shaped yoke 40 for engagement with the push-fit coupling. The shroud 22 is preferably attached to the periphery of the lower disc 16 and leaves spacing for the upper disc 14 to revolve and compress within it. If necessary, the two discs 14, 16 may be differentially sized to accommodate this. The shroud 22 offers protection to the internally threaded components.

The threaded stem 13 also passes through a polymer friction-reducing washer 18 and bearing washer 17 both sandwiched between the yoke 6 of handle 3 and the upper disk 14, and on into pivot pin 11. Thus, the spacing between disks 14, 16 can be set by hand by turning finger knob 15 and/or, alternatively, counter-rotating/ratcheting the handle 3 around. Given a radius r1 of ⅜" and radius r2 of ½" then levering the handle from vertical (FIG. 1) 90 degrees horizontal cams the disks 14, 16 together another ⅛". The two discs 14, 16 are also secured together by a plurality, e.g., two radially-positioned spring-loaded spindles 19 that bias the two disks 14, 16 apart and maintain them in a parallel-spaced relation. The two discs 14, 16 are otherwise free to rotate about stein 11 and to slide inward together along the stem 15, and indeed may be forced together by camming the handle 3 and overcoming the spring-bias of spindles 19.

In operation, the tool 2 is advanced toward a joined pipe and push-fit coupling. The compression carousel 4 is rotated to find the appropriately-sized yoke 40, revolving around the stem 13 to expose the selected yoke 40 within the open collar of the shroud 22. The tool 2 is advanced until the push-fit coupling enters and is seated in the opposing yokes 40 of the compression carousel 14. Simply ratcheting or levering the handle 3 compresses the pair of clover-shaped discs 14, 16, which are forced together against the spring-bias of spindles 19. This eventually breaks and separates the push-fit coupling.

Figure 3:
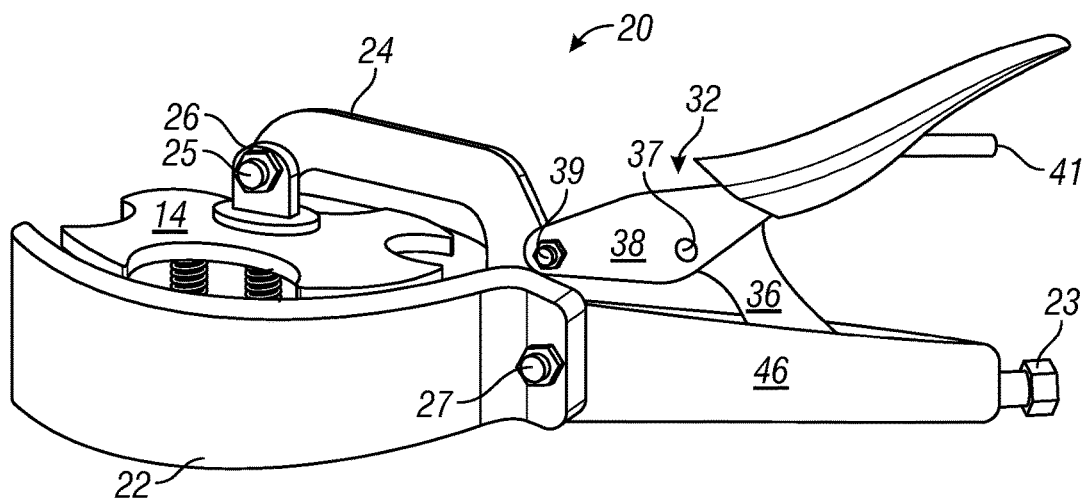
FIG. 3 is a side perspective view of a push-fit decoupling tool according to another embodiment of the invention.
Figure 4:
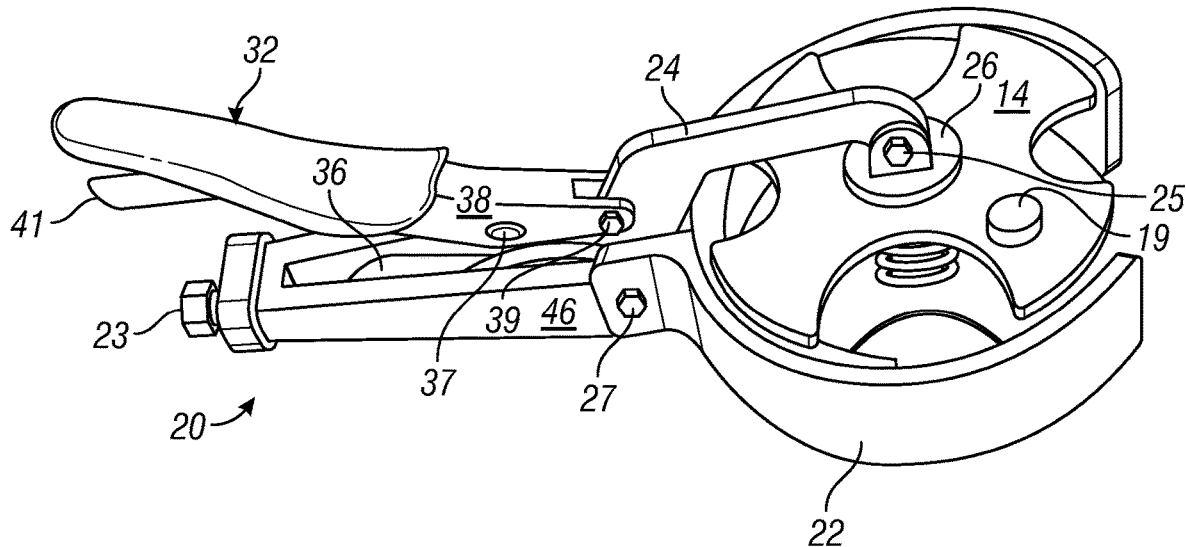
FIG. 4 is a top perspective view of the push-fit decoupling tool of FIG. 3.
Figure 5:
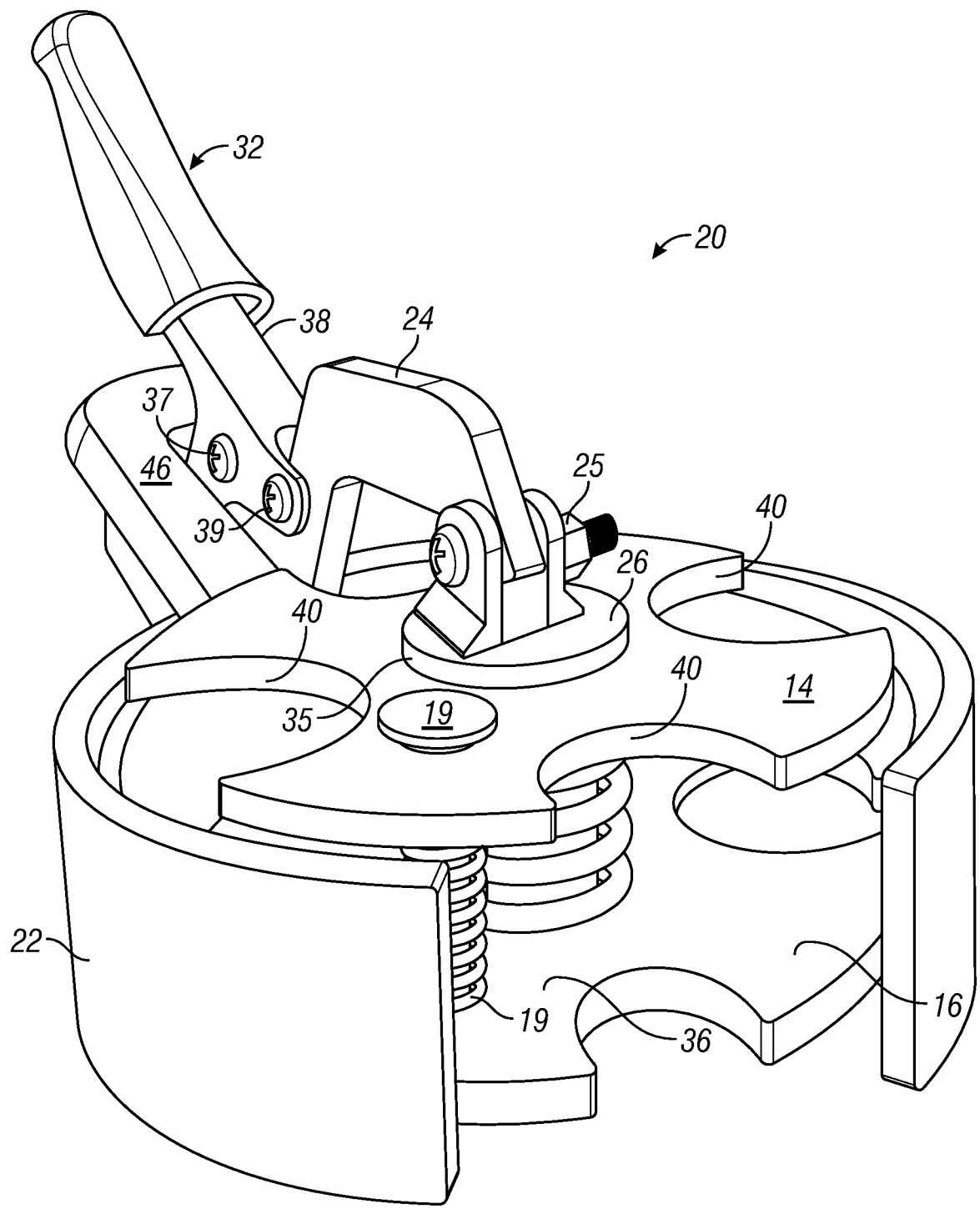
FIG. 5 is a front perspective view of the push-fit decoupling tool of FIGS. 3-4.

FIGS. 3-5 are a side perspective view, top view, and front perspective view, respectively, of a push-fit decoupling tool 20 according to an alternate embodiment of the invention. As best seen in FIG. 5, the compression carousel 4 is as described above, including a pair of clover-shaped discs 14, 16 as above that engage each other at a telescoping central stem 13 that allows for the discs 14, 16 to be slidably compressed together or retracted apart. The compression carousel 4 is rotatably mounted on the stem 13 which extends through the discs 14, 16. Each disk 14, 16 is attached to one of two opposing feet 26 of a vice-grip assembly 32. Thus, stem 13 may be affixed to one of the two feet 26, but must be free to extend through the other. This way, the compression carousel 4 is carried by feet 26 between movable jaws 24. Again the two discs 14, 16 are secured together by a plurality of radially-positioned spring-biased spindles 19. In addition, the two discs 14, 16 are spring-biased apart by a central axle-spring 37 mounted on the stem 13. However, the two discs 14, 16 are otherwise free to rotate about stem 13, and to slide along the stem 13 and spindles 19 and may be forced together by overcoming the spring-bias. Thus, by setting the advantage of a fulcrum bar 36, the compression carousel 4 can be squeezed together a known distance by vice-grip assembly 32.

As above, the spindle-type compression carousel 4 revolves around the stem 13 to expose the selected yoke 40 within the open collar of a shroud 22. In this instance, the shroud 22 is integral to a handle 46 of the vice-grip assembly 32.

As best seen in FIG. 5, the movable jaw 24 is arch-shaped and extends from foot 26 backward and inward where it is pivotally secured by another bolt/nut combination (second pivot 27) to the junction of handle 46 and shroud 22. The operating lever 38 extends along stationary handle 46 to provide a squeezable grip, and is pivotally secured by a third bolt/nut combination (third pivot 39) to the movable jaw 24 between the other pivots 25, 27. Rearwardly of third pivot 29, a bar 36 is pivotally connected by a fourth nut/bolt combination (fourth pivot 37) to operating lever 38 which forms a fulcrum for operating lever 38. The other end of bar 36 extends into stationary handle 46, to which it is secured for movement lengthwise of the handle 46 to vary the advantage of the fulcrum at pivot 37 for operating lever 38. For adjusting the end of fulcrum bar 36 lengthwise inside stationary handle 46, the end of the fulcrum bar 36 is pivotally secured by a set pin 23 threaded transversely into the end of stationary handle 46. The end of the fulcrum bar 36 may be pivotally attached to the end of the set pin 23, or may just be held captive by it. Either way, adjustment of the set pin 23 into/out from stationary handle 46 will increase/decrease the advantage of the fulcrum bar 36 and thereby increase/decrease the maximum travel of the jaw 24 and foot 26 relative to the fixed shroud 22. The fixed shroud 22 is a circular annulus with a closed or partially-closed bottom, and an open collar pointed away from handle 46. The compression carousel 4 sits inside shroud 22 and may be compressed against the closed bottom by vise-grip assembly 32.

Thus, in operation, the tool 20 is advanced toward a joined pipe and push-fit coupling. The compression carousel 4 is rotated to find the appropriately-sized yoke 40. The tool 20 is advanced until the push-fit coupling enters the open collar of shroud 22 and is seated in the opposing yokes 40 of the compression carousel 4. Simply squeezing the operating lever 38 compresses the pair of clover-shaped discs 14, 16, which are forced together against the spring-bias. This eventually breaks and separates the push-fit coupling. Again, by setting the advantage of fulcrum bar 36, the travel of the compression carousel 4 can be limited to a pre-determined distance. It should now be apparent that the above-described push-fit de-coupling tool 20 affords head-on remote access to the fitting in a tight space, increased mechanical advantage utilizing vise-grip leverage to provide separation force, and works to easily compress and release the push-fit coupling no matter which size it is.

Having now fully set forth the preferred embodiment, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

I claim:

1. A de-coupling tool for push-fit connectors, comprising:
   a compression carousel including a pair of disks each formed with an edge interrupted by plurality of U-shaped recesses opening peripherally into the edge of said disc, and a central stem joining said disks together in a spaced relation; and
   a handle pivotally connected to said stem and configured to cam said pair of disks together;
   wherein said handle is pivotally connected to said stem at a yoke configured to cam said pair of disks together; and
   wherein said yoke comprises two flanking flanges separated by a notch, and a though-bore passing through said flanges.

2. The decoupling tool according to claim 1, wherein said handle is attached to the compression carousel by a pivot pin inserted through the though-bore passing through said flanges.

3. The decoupling tool according to claim 1, wherein said stem passes through said pair of discs and is threaded into said pivot pin.

4. The decoupling tool according to claim 1, wherein said pair of discs are biased apart by a plurality of spring-biased spindles.

5. The decoupling tool according to claim 1, wherein said pair of discs each comprises four U-shaped recesses.

6. The decoupling tool according to claim 1, wherein said plurality of U-shaped recesses are equi-angularly spaced about each of said pair of discs.

7. The decoupling tool according to claim 1, further comprising an annular shroud surrounding both of said pair of discs.

8. A de-coupling tool for push-fit connectors, comprising:
   a compression carousel including a parallel pair of clover-shaped discs slidably secured together by a central axle and a plurality of radially-spaced spindles, said pair of discs being spring-biased apart by at least one spring, said clover shaped discs each being defined by a plurality of radially-spaced yokes of various sizes for capturing different sizes of push-fit couplings, the compression carousel being rotatable about said central axle to select an appropriately-sized pair of said yokes; and
   a hand-operated vise-grip assembly for compressing the opposing discs of said compression carousel together.

9. The de-coupling tool according to claim 8, wherein said vise-grip assembly includes a stationary handle that extends to a fixed annular shroud for seating said compression carousel.

10. The de-coupling tool according to claim 9, wherein said vise-grip assembly includes an operating lever for articulating a movable jaw counter-opposed to said shroud.

11. The decoupling tool according to claim 8, wherein said central axle passes through said pair of discs and is anchored to said vice grip assembly.

12. The decoupling tool according to claim 8, wherein said pair of discs are biased apart by a plurality of spring-biased spindles.

13. The decoupling tool according to claim 8, wherein said pair of discs each comprises four U-shaped recesses.

14. The decoupling tool according to claim 13, wherein said plurality of U-shaped recesses are equi-angularly spaced about each of said pair of discs.

15. A de-coupling tool for push-fit connectors, comprising:
   a compression carousel including a parallel pair of clover-shaped discs slidably secured together by a central axle and a plurality of radially-spaced spindles, said pair of discs being spring-biased apart by at least one spring, said clover shaped discs each being defined by a plurality of radially-spaced yokes of various sizes for capturing different sizes of push-fit couplings, the compression carousel being rotatable about said central axle to select an appropriately-sized pair of said yokes, and said central axle having a threaded section protruding on one side of said pair of discs; and
   a lever assembly rotatably attached at one end to the threaded section of said central axle for compressing the opposing discs of said compression carousel together.

16. The de-coupling tool according to claim 15 wherein said lever assembly is a vice grip.

17. The de-coupling tool according to claim 15 wherein said lever assembly is a cam.

* * * * *